United States Patent Office 2,884,304
Patented Apr. 28, 1959

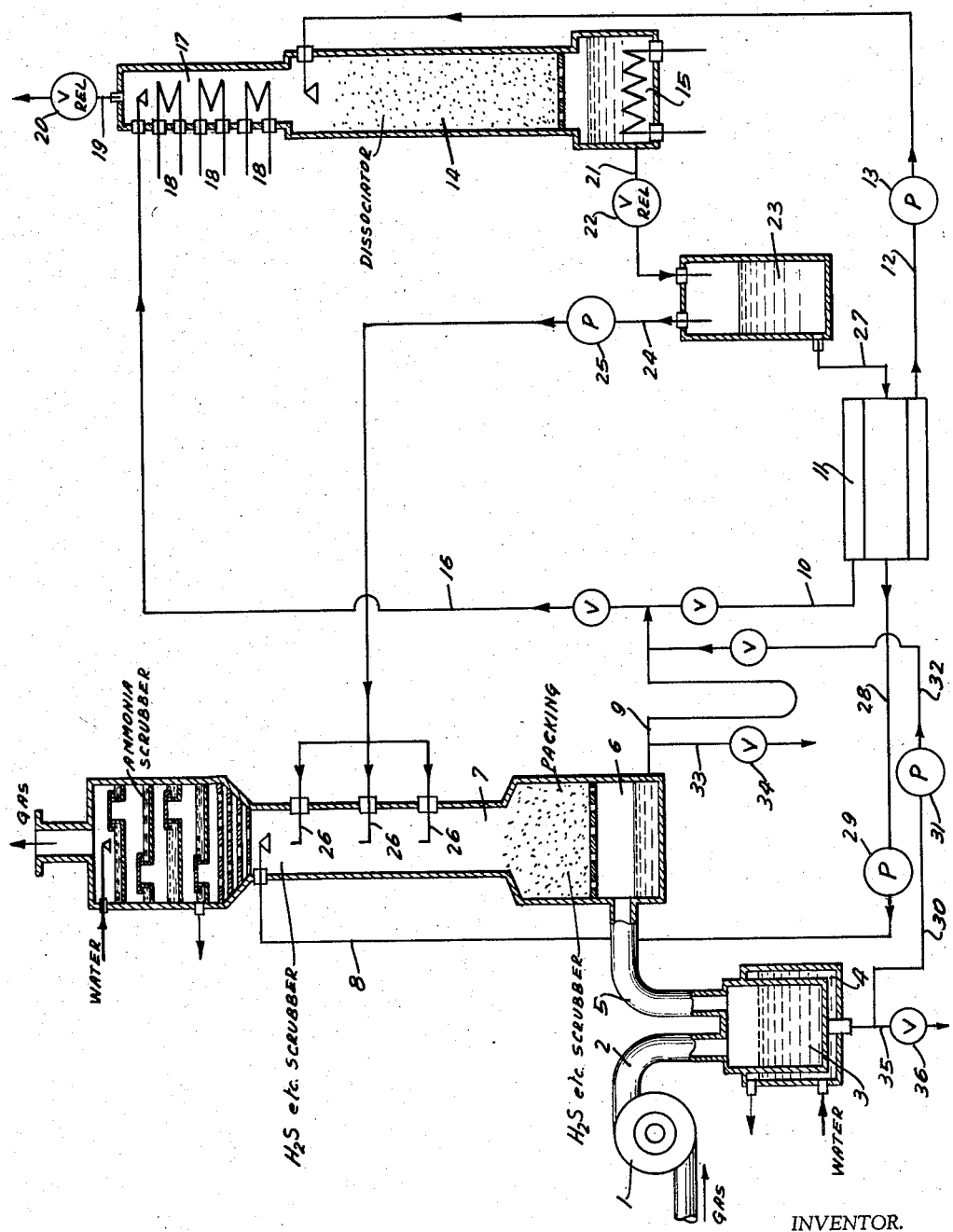

2,884,304

PURIFICATION OF COAL DISTILLATION GASES

Otto Grosskinsky, Alfred Adelsberger, and Walter Klempt, Dortmund-Eving, Germany Application August 17, 1954, Serial No. 450,403

9 Claims. (Cl. 23—3)

The present invention relates to the purification of coal distillation gases, and more particularly to the removal of acid gaseous constituents, and most particularly hydrogen sulfide, from gases obtained upon carbonization of carbonaceous materials, e.g. coke oven gas, town gas and the like.

The present application is a continuation-in-part of our copending application Serial No. 196,153, filed November 17, 1950, and now abandoned, for "Method of Gas Purification."

It has been known to remove hydrogen sulfide and other gaseous acid constituents from coke oven gas or similar gases by scrubbing the gases with aqueous ammonia solutions obtained by utilizing the natural ammonia content of the gases. The ammonia solution leaving the scrubbing device and charged with the absorbed acid gases, mainly hydrogen sulfide, is regenerated by distillation carried out in a dissociator, and recycled to the scrubber.

In our copending application of which the present is a continuation-in-part we have further disclosed the carrying out of both steps, e.g. scrubbing and dissociating, under superatmospheric pressure. For this purpose the detarred and cooled raw gas is compressed prior to entering the scrubber, the latter being operated at the superatmospheric pressure desired, whereas the dissociator is operated in known manner utilizing superatmospheric pressure inside the dissociator.

Scrubbing the gas in compressed condition offers the advantage that the scrubber employed therefor may be constructed of comparatively small dimensions and an ammonia water of higher concentration may be employed resulting in a comparatively high concentration of $H_2S$ in the liquid leaving the scrubber. In all events, gases employed for long distance transmission purposes require compressing, and the inevitable compression expenses are paid for, at least partly, by scrubbing devices of a small volume, as indicated above. On the other hand, the dissociation of the ammoniacal washing liquid proceeds more precisely at superatmospheric pressure than at normal pressure, the percentage of ammonia carried away by distillation of the liquid being comparatively small and the remainder of $H_2S$ and $CO_2$ in the dissociated solution being kept low accordingly.

In recycling the washing liquid between scrubber and dissociator, losses of ammonia cannot be permanently avoided, whether the dissociator is operated at normal or at superatmospheric pressure. Consequently, the problem consists in supplementing the aforesaid ammonia losses. For this purpose it might be possible to separate—anywhere—the ammonia contained in the gas and feed a part of said ammonia into the liquid circulated between scrubber and dissociator, the ammonia being employed either in gaseous condition or as a highly concentrated aqueous solution. Such recovering of ammonia would be exceedingly expensive and complicated, however, requiring large absorbing and distilling equipment and, moreover, considerable amounts of thermal energy.

It is therefore a primary object of the present invention to provide a method of supplementing the ammonia losses occurring in scrubbing the compressed raw gas without necessitating a special and expensive equipment for recovering the ammonia required therefor.

Still another object of the invention consists in keeping constant the amount and the concentration of the ammonia solution circulated between scrubber and dissociator, so that a quasi-equilibrium is established between the circulating liquid and the flowing gas in such a manner that neither the ammonia percentage of the gas passing the scrubber nor that of the circulating scrubbing liquid is changed.

Another object of the present invention consists in carrying out the treatment of the compressed raw gas with an aqueous ammonia solution in such a manner that the hydrogen sulfide is selectively removed, whereas only small amounts of carbon dioxide are absorbed.

Other objects and advantages of the present invention will be apparent from a further reading of the specification and of the appended claims.

With the above objects in view, the present invention mainly consists in a process of removing hydrogen sulfide from a coal distillation gas containing the same and also containing water vapor and a high percentage of ammonia, comprising the steps of compressing the coal distillation gas, cooling said compressed gas so as to condense said water vapor and form an aqueous condensate having a high concentration of ammonia, scrubbing the non-condensed compressed gas with an aqueous ammonia solution having a predetermined ammonia concentration which is lower than the ammonia concentration of the aqueous condensate, thereby causing absorption of hydrogen sulfide contained in the gas by the aqueous ammonia solution and causing also dilution of the aqueous ammonia solution due to loss of a portion of the ammonia therefrom, separating from the scrubbed gas the thus obtained diluted aqueous ammonia solution containing absorbed hydrogen sulfide, withdrawing from the diluted aqueous ammonia solution a portion thereof and adding to the diluted aqueous ammonia solution an amount of the aqueous condensate, the withdrawn portion of the diluted aqueous ammonia solution and the added amount of the aqueous condensate being so adjusted that the resulting mixture has the same volume and ammonia concentration as the aqueous ammonia solution, distilling-off the hydrogen sulfide from the formed mixture at superatmospheric pressure, thereby recovering a purified aqueous ammonia solution having the predetermined ammonia concentration, and recycling the purified aqueous ammonia solution for the scrubbing of additional non-condensed compressed gas.

The raw gas which is treated according to the present invention generally contains carbon dioxide in addition to the hydrogen sulfide and the present invention provides also for the elimination of the carbon dioxide as well as the hydrogen sulfide. According to a preferred embodiment of the present invention special procedures are utilized which result in a more selective removal of the hydrogen sulfide from the gas. These procedures will be described in more detail in the later discussion.

According to the present invention the compressed gas which may be any coal distillation gas such as coke oven gas, town gas, waste gas resulting from hard coal hydrogenation, and the like, after leaving the compressing equipment is passed prior to entering the scrubber through a cooler and separating vessel in which an aqueous condensate is formed, the aqueous condensate actually being a highly concentrated ammonia solution containing about 10–15% of ammonia. A portion of this condensate is, according to the present invention continuously fed into the ammoniacal liquid leaving the scrubber and passing to the dissociator, the circulating scrubbing liquid thus being constantly supplied with fresh ammonia to compensate for the ammonia loss during the scrubbing process. On the other hand, the volume of the washing liquid is constantly increased by the water of the ammoniacal aqueous condensate coming from the compressor into the scrubbing liquid. This is undesirable in that continuous increase in the volume of the scrubbing liquid would result in "drowning" of the apparatus and stopping of the process. Therefore the present invention provides for the continuous tapping-off of the scrubbing ammonia liquid leaving the dissociator before the addition of the aqueous condensate thereto. Thus, the present invention provides that the amount of ammonia introduced into the scrubbing liquid by the aqueous compressor condensate is large enough to compensate for the ammonia losses caused by the acid waste gases leaving the dissociator and, in addition, to balance the ammonia losses resulting from the tapping-off of some of the ammonia scrubbing liquid. The amount of ammonia scrubbing liquid which is withdrawn is, of course, adjusted so as to compensate for the water introduced into the circulating system by the aqueous compressor condensate.

When carrying out the process hereinbefore described it will be advantageous to remove or at least reduce the amount of certain constituents of the raw gas before compressing, these constituents being tar (or tar-forming substances), hydrocyanic acid, and carbon dioxide. Tar and tar-forming substances have a tendency to contaminate the internal parts of the compressor and to cause serious difficulties in its operation. Hydrocyanic acid corrodes the compressor and the other apparatus, unless constructed of acid resisting metal alloys, which is an expensive measure. The removal of the carbon dioxide or at least its bulk helps to relieve the hydrogen sulfide scrubber and the subsequent column, because the carbon dioxide would otherwise consume a part of the ammonia actually intended for combination with hydrogen sulfide.

Tar and tar-forming substances may be removed electrostatically or mechanically. The electrostatic method gives the best results, but the equipment is very expensive. Mechanical devices are considerably cheaper, but not as satisfactory however, because they leave a remainder of about 0.15 gram of tar per cubic meter. However, the mechanical method can be employed provided that measures are taken to remove the remaining tar in the compressor itself. This may be effected by saturating the gas (before compressing) at moderately elevated temperatures, such as 60° C. with vapors of an oil free from naphthalene and able to dissolve tar. A tar oil fraction having a boiling point range between 270° to 320° C. is preferably employed. In lieu of saturating the gas with oil vapors, the oil may be sprayed into the cylinder or the box of the sucking-valve of the compressor. By such means, the tar constituents of the gas are effectively prevented from depositing in the internal parts of the machine, and simultaneously those parts are protected to some extent against corrosions caused by hydrocyanic acid, if any, and other acid constituents present in the gas. The oil is then separated from the gas in condensing vessels arranged behind the compressors. The oil may be treated in any known manner. With reference to the oil, the process taking place in the cylinder of the compressor is similar to a benzene scrubber process, and consequently the ensuing treatment of the oil leaving the machinery is identical with the treatment of the washing oil leaving a benzene scrubber.

The method of removing the hydrocyanic acid from the raw gas consists in subjecting said gas, prior to its entry into the compressor, to any known process employed for binding hydrocyanic acid. One method consists in scrubbing the gas with aqueous solutions of ammonium polysulfides, the HCN being thus bound as $NH_4CNS$. Another method consists in scrubbing with ferric hydroxide suspended in aqueous ammonia, the HCN being converted to ferrocyanides.

The removal of the gaseous acid constituents ($H_2S$ and $CO_2$) absorbed by the liquid is carried out in a dissociator operated under superatmospheric pressure. Prior to the present invention, the ammonia liquid leaving the dissociator was cooled, then recycled to the top of the scrubber and in countercurrent contacted with the gas to be purified. However, to achieve a selectivity as high as possible in removing hydrogen sulfide, involving only a small absorption of carbon dioxide and an economical concentration of hydrogen sulfide in the scrubbing liquid, it is preferred to operate the scrubber in two stages. For this purpose the scrubber is divided into two regions, an upper and a lower one. In order to achieve a high velocity of gas flow and, accordingly, a short residence time of the gas in the upper region, this region is constructed as an upright and comparatively stretched empty cylinder of moderate diameter, whereas the lower region is a cylinder of moderate length but comparatively large diameter, in order to retard the gas flow and to have a longer residence time of the gas therein. In addition, the lower cylinder is packed with a porous inert material having a large surface area, e.g. Raschig rings, in order to achieve an intimate contact between the gas and the scrubbing liquid.

Aqueous ammonia is sprayed in at the top of the upper cylinder, moving downwards and drizzling through the packing of the lower cylinder. The gas entering at the bottom of said cylinder moves upwards, thus being countercurrently contacted with the liquid. In the lower cylinder the gas is intensively scrubbed in order to remove as much hydrogen sulfide as possible, regardless of the carbon dioxide amount absorbed simultaneously. In the upper cylinder the gas is selectively scrubbed with fresh liquid in order to remove a further part of hydrogen sulfide and to absorb as little carbon dioxide as possible.

The gist of the two-stage scrubbing pointed out above is based upon the fact that a good selective absorption of $H_2S$ (i.e. absorbing $H_2S$ and absorbing no or but little $CO_2$) is not synonymous with a satisfactory removal of $H_2S$ from the gas. When scrubbing the gas only in an apparatus similar to the upper (second) stage of the aforesaid apparatus (long, narrow empty cylinder, short residence time), the absorption of $H_2S$ is pretty moderate (this being undesired), the absorption of $CO_2$ is weak (this being desired), and the degree of selectivity is good. On the other hand, when scrubbing only in an apparatus similar to the lower (first) stage of the aforesaid apparatus (short, wide, packed cylinder; long residence time), the absorption of $H_2S$ is intensive (desired), the absorption of $CO_2$ is intensive, too (undesired), and the degree of selectivity is merely nominal. When combining the two methods, as aforesaid, however, the $H_2S$ absorption is intensive (desired), that of $CO_2$ is moderate (desired), and the selectivity is satisfactory.

From the point of view of the quality of the final gas to be produced, no damage would be done by removing the $CO_2$, of course, since this gas is merely a ballast. However, $CO_2$, when absorbed, requires ammonia liquid, this liquid thus being prevented from being fully utilized for its proper task, namely absorbing $H_2S$. Consequently, removing $H_2S$ and burdening the liquid by additionally absorbing $CO_2$, would require larger amounts of circulating liquid (larger apparatus) and, finally, larger amounts of thermal energy in dissociating the spent washing liquid.

The selectivity in absorbing $H_2S$ is additionally improved by introducing highly concentrated ammonia vapors into the upper region of the scrubber, preferably at a plurality of different level places. Because of the retarded hydration of the carbon dioxide, provided by said introduction of $NH_3$, the selective absorption of $H_2S$ is promoted, the ammonia vapors required for this purpose being recovered, moreover, in a new and most suitable manner, as pointed out below. The high ammonia percentage incorporated into the gas passing the upper region of the scrubber is balanced by the more diluted ammonia solution introduced at the top of said scrubber.

The gist of this two-stage scrubbing is to advantageously change the ratio $NH_3:H_2S$; in the first (lower) region a part of the $H_2S$ is removed from the gas, as aforesaid, and in the second (upper) region the gas is transitorily supplied with additional ammonia so as to contact a small amount of $H_2S$ with a large amount of $NH_3$. The higher the percentage is the gas of anhydrous ammonia compared with the hydrogen sulfide present, the better will be the selective removal of the $H_2S$.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the drawing schematically illustrates an apparatus for carrying out the process of the present invention.

Referring now more particularly to the drawing, the raw gas freed from tar and resinous or resin forming substances enters the compressor 1 wherein it is brought to the pressure desired. The compressed gas passes through conduit 2 into a separating vessel 3 surrounded by a water cooled jacket 4. Then the gas enters by conduit 5 into a reservoir 6 forming the lower part of a scrubber 7, and leaves said scrubber at the top of the same. As indicated above, the scrubber consists of two regions, the lower one being packed with Raschig rings. The upper region is empty. Aqueous ammonia is introduced through conduit 8 into the top of the scrubber, the ammonia water being collected in reservoir 6. A part of the liquid leaving 6 passes through conduits 9 and 10, heat exchanger 11, conduit 12 and pump 13 to the lower part 14 of a dissociator, this part being packed as the lower part of the scrubber. The liquid drizzling downwards through said packing is collected in a reservoir 15 in which it is heated by a steam-coil. The other part of liquid leaving reservoir 6 passes through conduits 9 and 16 to the upper part 17 of the dissociator and some ammonia carried away with the acid constituents leave the apparatus through conduit 19 and pressure relief valve 20, the latter controlling the pressure in the dissociator to be preferably between 5–7 superatmospheres.

The dissociated ammonia solution collected in reservoir 15 might be recycled without further ado to the top of scrubber 7. However, in order to further improve the selective removal of $H_2S$ from the gas, the aforesaid dissociated ammonia solution is passed through conduit 21 and pressure relief valve 22 into vessel 23 in which, owing to the expansion occurring and the elevated temperature prevailing therein, a part of the ammonia is driven off as a highly concentrated ammonia vapor, said vapor being returned by conduit 24 and pump 25 to the scrubber and introduced, as indicated, into the non-packed upper region of scrubber 7 at a plurality of different level places 26 (in the drawing three levels are shown), thus supplying the gas moving upwards in the scrubber with additional ammonia.

The diluted ammonia solution collected in vessel 23 is returned to the top of scrubber 7 by conduit 27, heat exchanger 11, conduit 28, pump 29 and conduit 8. In order to cover the ammonia losses occuring in the circulating system mentioned before, a part of the aqueous compressor condensate formed in the separating vessel 3 is introduced into conduit 9, by conduit 30, pump 31 and conduit 32, subsequently being fed into the dissociator by conduits 10 and 16, respectively. A part of the circulating liquid is continuously tapped-off by conduit 33, and valve 34 as a comparatively diluted ammonia water in such a manner that the total amount of the circulating liquid remains constant. The excess aqueous compressor condensate formed in vessel 3 is removed from the system by conduit 35 and valve 36 and may be used for any other suitable purpose.

The purified gas leaving scrubber 7 is passed through an additional ammonia scrubber preferably arranged above the top of scrubber 7. This ammonia scrubber is operated with water and serves to remove $NH_3$ and residual $H_2S$ from the gas. Since this scrubber is self-explanatory, forming not part of the present invention, it is unnecessary to further describe it or designate it in the drawing. It is obvious that means should be provided in order to prevent droplets or clouds of the liquor sprayed in at the top of scrubber 7 from being carried away by the gas moving upwards. Such means may consist e.g. of a series of horizontal perforated plates the gaps of which are arranged so that the upper plate acts as a baffle-plate with respect to the lower one, as indicated.

As pointed out above, scrubber and dissociator are operated at superatmospheric pressure, involving a high $H_2S$ concentration in the scrubbing liquid. Nevertheless, it is not advisable to employ exceedingly high pressures. Taking no account of the fact that in raising the pressure more and more, the aforesaid $H_2S$ concentration asymptotically approaches a final maximum value so that ultimately the gradually increasing expenses of compression no longer pay for the $H_2S$ concentration obtained, it should be noted, furthermore, that, in addition, excessive pressures promote the absorption of $CO_2$, thus disturbing the selective removal of $H_2S$ aimed at. For this reason it would be useless to employ pressures exceeding 20 atmospheres in the scrubber.

Similar conditions prevail in operating the dissociator, the dissociation being carried out more easily, as is known, when the pressure is raised, whereas the $H_2S$ and the $CO_2$ percentage of the dissociated solution is dropped accordingly. This advantage is handicapped, however, by the thermal energy required for dissociating. Raising the pressure raises the temperature of the solution, and keeping the raised temperature necessitates more energy at increased pressure; the economical limit being soon attained; and said limit even exists when utilizing the thermal energy of the dissociated liquid for preheating by way of heat exchange. The following figures impressively show how matters stand in practice: Suppose that 1 metric ton of 15 atmospheres pressure steam containing 466,000 kg. calories costs $2.00; in this case 1 ton of 3 atmospheres pressure waste steam containing 517,000 kg. calories would be worth $1.33.

Preferably a pressure of about 4–10 atmospheres and most preferably about 6–8 atmospheres is utilized in the scrubber. In the dissociator a pressure of 2–7 atmospheres and preferably 3–5 atmospheres is utilized. The concentration of the aqueous ammonia solution utilized for the scrubbing is most preferably between 4–9% whereas the concentration of the aqueous compressor condensate is generally about 10–15%.

The following examples are given as illustrative of the process of the present invention, the scope of the invention not however being limited to the specific details of the examples.

In the following examples, all gas volumes are measured by standard cubic meters (1 m.³ at 0° C. and at 760 mm. Hg pressure), and the amount of gas treated is 1000 cubic meters unless otherwise specified.

*Example I*

A raw coke oven gas preliminarily freed of the bulk of water and tar by condensation, and subsequently subjected to an electrostatic detarring device, is cooled to 25° C. After this treatment, 1000 standard cubic meters of said raw gas contains less than 0.02 kg. tar, 25 kgs. water, 5.2 kgs. $NH_3$, 10.7 kgs. $H_2S$, 39 kgs. $CO_2$ and 26 kgs. aromatic hydrocarbons. The gas is now subjected to 8 atmospheres pressure and subsequently cooled again to 25° C. In the cooling device 3 behind the compressor, 7 kgs. aromatic hydrocarbons and 22 liters of an aqueous condensate are obtained, the latter containing 145 gms. ammonia, 130 gms. carbon dioxide and 20 gms. hydrogen sulfide per liter.

The gas, still containing 2.0 kgs. $NH_3$, 36 kgs. $CO_2$, 10.3 kgs. $H_2S$ and 19 kgs. aromatic hydrocarbons, is scrubbed at the aforesaid pressure and at a rate of 0.7 meter per second with 0.28 cubic meter of a 5.5% aqueous ammonia solution. The liquid leaving the hydrogen sulfide scrubber contains 50 gms. $NH_3$, 34 gms. $H_2S$, and 19 gms. $CO_2$ per liter.

17 liters of the liquid leaving the scrubber are tapped off and 17 liters of the aqueous condensate obtained in the cooling device are then added to the liquid leaving the scrubber, thereby obtaining an aqueous liquid having approximately the same ammonia concentration as the original scrubbing liquid and approximately the same volume. The thus obtained liquid is then passed after reducing the pressure to 6 atmospheres to the dissociator indirectly heated by steam to 160° C. in the lower part of said apparatus. A waste gas is obtained containing 95% of the $H_2S$ and 85% of the $CO_2$ introduced by the liquid.

The ammonia water returning from the dissociator to the $H_2S$ scrubber passes the heat exchanger and the cooler, where it is cooled to 20–25° C., this temperature being used in the $H_2S$ scrubber. The liquid returning to the $H_2S$ scrubber contains 55 gms. $NH_3$, 3 gms. $H_2S$ and 5 gms. $CO_2$ per liter. The residual amount of the aqueous condensate from the cooling device and the diluted aqueous ammonia solution tapped off after leaving the scrubber may be passed to a still wherein the ammonia may be distilled-off.

The gas, free of $H_2S$ and $NH_3$ and being constantly subjected to 8 atmospheres pressure, is liberated from the residual benzol in a scrubbing column. The final gas contains only 300 gms. aromatic hydrocarbons of low boiling point per 1000 standard cubic meters.

The following two examples are given to show the advantage obtained by scrubbing a compressed gas in a two-stage scrubber operated according to the present invention as compared with the scrubbing of the gas in the known manner in a packed one-stage scrubber.

*Example II*

316 N.T.P. C.B.M. of a raw gas containing 40 gms. $CO_2$, 2 gms. $NH_3$ and 8 gms. $H_2S$ per C.B.M. are compressed to 10 atmospheres (abs.) and then in countercurrent contacted in a one-stage packed scrubber with 140 liters of an aqueous 8% by weight ammonia solution, said contacting being carried out in a scrubber forming substantially an upright cylinder of about 35 cm. clear diameter. The residence time of the gas is 2 seconds. After scrubbing, the gas contains 28.8 gms. $CO_2$, 3.0 gms. $NH_3$ and still 0.1 gm. $H_2S$ per N.T.P. C.B.M. The liquid leaving the scrubber contains 18 gms. $H_2S$ and 25 gms. $CO_2$ per liter.

When scrubbing the same gas under the same pressure and the same residence time in a two-stage scrubber according to the present invention (lower part about 35 cm. diameter, packed; upper part about 16 cm. diameter, empty), the exit gas contains 31 gms. $CO_2$, 3.0 gms. $NH_3$ and only 0.001 gm. $H_2S$ per N.T.P. C.B.M., the leaving liquid containing 18.5 gms. $H_2S$ and 20 gms. $CO_2$ per liter.

*Example III*

316 N.T.P. C.B.M. of the same gas as in Example I is compressed to 10 atmospheres and subsequently treated with a liquid which would correspond to 130 liters of an aqueous 8% by weight ammonia solution. In this case, however, the ammonia amount (10.4 kgs. $NH_3$) assumed to be contained in the liquid, is partially added in the scrubber itself, namely by introducing a more diluted ammonia liquid at the top of the upper part of said scrubber, and completing the deficit of $NH_3$ by introducing gaseous ammonia into the upper part of the scrubber, substantially as described above, so as to obtain a waste liquid containing, as aforesaid, 8% by weight $NH_3$. The waste liquid contains 19.2 gms. $H_2S$, 15 gms. $CO_2$ and 78 gms. $NH_3$ per liter. The scrubbed exit gas contains 34 gms. $CO_2$, 3.2 gms. $NH_3$, the $H_2S$ percentage being below 0.1 gm. per cubic meter.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of removing hydrogen sulfide from a coal distillation gas containing the same and also containing water vapor and a high percentage of ammonia, comprising the steps of compressing said coal distillation gas to a predetermined pressure greater than atmospheric pressure; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; withdrawing from said diluted aqueous ammonia solution a portion thereof and adding to said diluted aqueous ammonia solution an amount of said aqueous condensate, said withdrawn portion of said diluted aqueous ammonia solution and said added amount of said aqueous condensate being so adjusted that the resulting mixture has the same volume and ammonia concentration as said first aqueous ammonia solution; distilling-off said hydrogen sulfide from the thus formed mixture under super-atmospheric pressure, thereby recovering a purified aqueous ammonia solution having said predetermined ammonia concentration; and recycling said purified aqueous ammonia solution into additional compressed gas for the scrubbing of the additional compressed gas.

2. A process of removing hydrogen sulfide from a coal distillation gas containing the same and also containing water vapor, carbon dioxide and a high percentage of ammonia, comprising the steps of compressing said coal distillation gas to a predetermined pressure greater than atmospheric pressure; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide and carbon dioxide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide and carbon dioxide; withdrawing from said diluted aqueous ammonia solution a portion thereof and adding to said diluted aqueous ammonia solution an amount of said aqueous condensate, said withdrawn portion of said diluted aqueous ammonia solution and said added amount of said aqueous condensate being so adjusted that the resulting mixture has the same volume and ammonia concentration as said first aqueous ammonia solution; distilling-off said hydrogen sulfide and carbon dioxide from the thus formed mixture under superatmospheric pressure, thereby recovering a purified aqueous ammonia solution having said predetermined ammonia concentration; and recycling said purified aqueous ammonia solution into additional compressed gas for the scrubbing of the additional compressed gas.

3. A process of removing hydrogen sulfide from a coal distillation gas containing the same and also containing water vapor and a high percentage of ammonia, comprising the steps of compressing said coal distillation gas to a predetermined pressure greater than atmospheric pressure; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; mixing a portion of said diluted aqueous ammonia solution with aqueous condensate and passing the resulting mixture to a dissociator, said portion of diluted aqueous ammonia solution and said aqueous condensate being mixed in such amount that the mixture passing to said dissociator has the same ammonia concentration and volume as said first aqueous ammonia solution and is fed to said dissociator at the same rate as said aqueous ammonia solution is used for scrubbing; distilling-off said hydrogen sulfide from the thus formed mixture in said dissociator under superatmospheric pressure, thereby recovering a purified aqueous ammonia solution having said predetermined ammonia concentration; and recycling said purified aqueous ammonia solution into additional compressed gas for the scrubbing of the additional compressed gas.

4. A process of removing hydrogen sulfide from a coal distillation gas containing the same and also containing water vapor and a high percentage of ammonia, comprising the steps of compressing said coal distillation gas to a predetermined pressure greater than atmospheric pressure and up to a maximum of 20 atmospheres; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; withdrawing from said diluted aqueous ammonia solution a portion thereof and adding to said diluted aqueous ammonia solution an amount of said aqueous condensate, said withdrawn portion of said diluted aqueous ammonia solution and said added amount of said aqueous condensate being so adjusted that the resulting mixture has the same volume and ammonia concentration as said first aqueous ammonia solution; distilling-off said hydrogen sulfide from the thus formed mixture under superatmospheric pressure of up to 7 atmospheres, thereby recovering a purified aqueous ammonia solution having said predetermined ammonia concentration; and recycling said purified aqueous ammonia solution into additional compressed gas for the scrubbing of the additional compressed gas.

5. A process of removing hydrogen sulfide from a coal distillation gas containing the same and also containing water vapor and a high percentage of ammonia, said ammonia being about 10–15% by weight of said water vapor, comprising the steps of compressing said coal distillation gas to about 4–10 atmospheres; cooling said compressed gas so as to condense said water vapor and form an aqueous condensate having a high concentration of ammonia of about 10–15% by weight; scrubbing the compressed gas with a first aqueous ammonia solution having a predetermined ammonia concentration of about 6–9% by weight which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; withdrawing from said diluted aqueous ammonia solution a portion thereof and adding to said diluted aqueous ammonia solution an amount of said aqueous condensate, said withdrawn portion of said diluted aqueous ammonia solution and said added amount of said aqueous condensate being so adjusted that the resulting mixture has the same volume and ammonia concentration as said first aqueous ammonia solution; distilling-off said hydrogen sulfide from the thus formed mixture under superatmospheric pressure of about 5–7 atmospheres, thereby recovering a purified aqueous ammonia solution having said predetermined ammonia concentration; and recycling said purified aqueous ammonia solution into additional compressed gas for the scrubbing of the additional compressed gas.

6. A process of removing hydrogen sulfide from a coal distillation gas containing the same and also containing water vapor and a high percentage of ammonia, comprising the steps of compressing said coal distillation gas to a predetermined pressure greater than atmospheric pressure; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; withdrawing from said diluted aqueous ammonia solution a portion thereof and adding to said diluted aqueous ammonia solution an amount of said aqueous condensate, said withdrawn portion of said diluted aqueous condensate being so adjusted that the resulting mixture has the same volume and at least the ammonia concentration of said first aqueous ammonia solution; distilling-off said hydrogen sulfide from the thus formed mixture under superatmospheric pressure, thereby recovering a purified aqueous ammonia solution having at least said predetermined ammonia concentration; and recycling said purified aqueous ammonia solution into additional compressed gas for the scrubbing of the additional compressed gas.

7. A process of removing hydrogen sulfide from a coal distillation gas containing the same and also containing water vapor and a high percentage of ammonia, comprising the steps of compressing said coal distillation gas to a predetermined pressure greater than atmospheric pressure; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; withdrawing from said diluted aqueous ammonia solution a portion thereof and adding to said diluted aqueous ammonia solution an amount of said aqueous condensate, said withdrawn portion of said diluted aqueous ammonia solution and said added amount of said aqueous condensate being so adjusted that the resulting mixture has the same volume and a higher ammonia concentration than said first aqueous ammonia solution; distilling-off said hydrogen sulfide from the thus formed mixture under superatmospheric pressure, thereby recovering a purified second aqueous ammonia solution having a higher ammonia concentration than said predetermined ammonia concentration; passing said purified second aqueous ammonia solution into an expansion vessel and vaporizing the ammonia above said predetermined ammonia concentration from said aqueous ammonia solution, thereby obtaining a purified aqueous ammonia solution of said predetermined concentration; and recycling said purified aqueous ammonia solution of said predetermined concentration into additional compressed gas for the scrubbing of the additional compressed gas.

8. A process of removing hydrogen sulfide from a coal distillation gas containing the same and also containing water vapor and a high percentage of ammonia, comprising the steps of compressing said coal distillation gas to a predetermined pressure greater than atmospheric pressure; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; withdrawing from said diluted aqueous ammonia solution a portion thereof and adding to said diluted aqueous ammonia solution an amount of said aqueous condensate, said withdrawn portion of said diluted aqueous ammonia solution and said added amount of said aqueous condensate being so adjusted that the resulting mixture has the same volume and a higher ammonia concentration than said first aqueous ammonia solution; distilling-off said hydrogen sulfide from the thus formed mixture under superatmospheric pressure, thereby recovering a purified second aqueous ammonia solution having a higher ammonia concentration than said predetermined ammonia concentration; passing said purified aqueous ammonia solution into an expansion vessel and vaporizing the ammonia above said predetermined ammonia concentration from said aqueous ammonia solution, thereby obtaining ammonia vapors and a purified aqueous ammonia solution of said predetermined concentration; passing said ammonia vapors into said compressed gas for scrubbing with said aqueous ammonia solution so as to promote selective removal of said hydrogen sulfide from said non-condensed compressed gas; and recycling said purified aqueous ammonia solution of said predetermined concentration into additional compressed gas for the scrubbing of the additional compressed gas.

9. A process of removing hydrogen sulfide from a coal distillation gas containing the same and also containing water vapor and a high percentage of ammonia, comprising the steps of compressing said coal distillation gas to a predetermined pressure greater than atmospheric pressure; cooling said compressed gas so as to condense said water vapor and form an aqueous condensate having a high concentration of ammonia; scrubbing the compressed gas with a first aqueous ammonia solution having a predetermined ammonia concentration which is lower than the ammonia concentration of said aqueous condensate, thereby causing absorption of hydrogen sulfide contained in said gas by said first aqueous ammonia solution and causing also dilution of said first aqueous ammonia solution due to loss of a portion of the ammonia therefrom; separating from said scrubbed gas the thus obtained diluted aqueous ammonia solution containing absorbed hydrogen sulfide; withdrawing from said diluted aqueous ammonia solution a portion thereof and adding to said diluted aqueous ammonia solution an amount of said aqueous condensate, said withdrawn portion of said diluted aqueous ammonia solution and said added amount of said aqueous condensate being so adjusted that the resulting mixture has the same volume and ammonia concentration as said first aqueous ammonia solution; distilling-off said hydrogen sulfide from said formed mixture under superatmospheric pressure, thereby recovering a purified aqueous ammonia solution having said predetermined ammonia concentration; passing said purified aqueous ammonia solution into an expansion vessel and vaporizing a portion of the ammonia therefrom, thereby obtaining ammonia vapors and a purified aqueous ammonia solution having an ammonia concentration lower than said predetermined concentration; passing said ammonia vapors into said compressed gas for scrubbing with an aqueous ammonia solution so as to promote selective removal of said hydrogen sulfide from said noncondensed compressed gas; and recycling said purified aqueous ammonia solution having an ammonia concentration lower than said predetermined concentration into additional compressed gas for the scrubbing of the additional compressed gas with the aid of said ammonia vapors added to said compressed gas.

References Cited in the file of this patent
UNITED STATES PATENTS

| | | |
|---|---|---|
| 1,360,734 | Doherty | Nov. 30, 1920 |
| 2,106,734 | Gollmar | Feb. 1, 1938 |
| 2,162,838 | Cole et al. | June 20, 1939 |
| 2,675,296 | Gollmar | Apr. 13, 1954 |